United States Patent [19]
Kato

[11] Patent Number: 5,460,059
[45] Date of Patent: Oct. 24, 1995

[54] DRIVE APPARATUS

[75] Inventor: Masataka Kato, Gifu, Japan

[73] Assignee: Nippon Thompson Co., Ltd., Tokyo, Japan

[21] Appl. No.: 172,255

[22] Filed: Dec. 23, 1993

[30] Foreign Application Priority Data

Dec. 28, 1992 [JP] Japan .............................. 4-093993 U

[51] Int. Cl.$^6$ .............................. F16H 19/06; F16H 7/08
[52] U.S. Cl. .................. 74/89.22; 74/89.21; 108/143; 474/101; 474/136
[58] Field of Search ............................. 74/89.21, 89.22; 474/101, 136; 108/143

[56] References Cited

U.S. PATENT DOCUMENTS

| | | | |
|---|---|---|---|
| 1,567,494 | 12/1925 | Fahrney | 474/101 X |
| 3,111,856 | 11/1963 | Backofen | 474/199 X |
| 3,388,604 | 6/1968 | McFarland et al. | 74/89.22 |
| 3,574,287 | 4/1971 | Heidacker | 474/136 |
| 3,777,577 | 12/1973 | Giacomello et al. | 74/89.22 |

FOREIGN PATENT DOCUMENTS 62-9059  1/1987  Japan .............................. 474/101

*Primary Examiner*—Allan D. Herrmann
*Attorney, Agent, or Firm*—Sughrue, Mion, Zinn, Macpeak & Seas; Richard C. Turner; Marc Kaufman

[57] ABSTRACT

A drive apparatus that, together with securing the lateral symmetry of the overall apparatus, minimizes the number of parts while also achieving a smooth operating state. A rotating member is provided that makes sliding contact at its outside surface with opposing portions of a belt-shaped member wrapped around each rotor to obtain a parallel state with respect to said opposing members. Thus, a driving device in the form of a motor and so on that rotates and drives said rotors can be arranged on a line extending from the center in the direction of width of a driven object. As a result, the lateral symmetry of the overall apparatus is secured. In addition, since the number of parts can be minimized, together with achieving a reduction in costs, a smooth operating state is obtained since said rotating member only makes sliding contact with said belt-shaped member.

4 Claims, 4 Drawing Sheets

DRIVE APPARATUS

BACKGROUND OF THE INVENTION

1. Field of the Invention

The present invention relates to a drive apparatus for moving an object (driven object) in a desired direction.

2. Description of the Prior Art

An example of the prior art having this type of drive apparatus is the positioning table shown in FIG. 1.

As shown in FIG. 1, two rotors in the form of toothed belt pulleys 1 and 2 are arranged separated from each other on a base (not shown) equipped on the positioning table. A belt-shaped member in the form of endless toothed belt 3 is wrapped around these toothed belt pulleys 1 and 2. In addition, a driving device in the form of motor 5 is provided that drives toothed belt pulley 1 by applying torque.

Another toothed belt pulley 6 is arranged in close proximity to the above-mentioned toothed belt pulley 1, and the toothed belt pulley 6 engages with toothed belt 3. In addition to this toothed belt pulley 6 acting as a device for maintaining opposing portions 3a and 3b of opposing toothed belt 3 parallel with each other between the above-mentioned toothed belt pulleys 1 and 2, it also applies the required tension to toothed belt 3.

Driven object 7 to be moved is provided between toothed belt pulleys 1 and 2. Said driven object 7 is composed of moving table 8 and sliding unit 9 coupled to the bottom surface of said moving table 8. Sliding unit 9 is straddled over track rail 10 and guided by track rail 10.

At least a portion of driven object 7, composed of the above-mentioned moving table 8 and sliding unit 9, is arranged so as to be surrounded by endless toothed belt 3, and is also coupled to toothed belt 3.

In the drive apparatus, toothed belt 3 is driven as the result of torque being applied to toothed belt pulley 1 by motor 5. Driven object 7 coupled to said toothed belt 3 then moves along track rail 10.

In the above-mentioned drive apparatus of the prior art, the center of motor 5 directly coupled to toothed belt pulley 1 in order to apply torque to said toothed belt pulley 1 is located at a position away from a line 7a extending from the center in the direction of the width of driven object 7. Accordingly, this drive apparatus has the disadvantage of motor 5 approaching one side together with the inclined portion 3c of toothed belt 3 only existing at a single location on the other side thus preventing lateral symmetry with respect to the overall apparatus.

Furthermore, although not shown in the drawings, devices that are able to solve the above-mentioned problems have also been considered. In one device, two toothed belt pulleys having a diameter smaller than the above-mentioned toothed belt pulley 6 are provided at laterally symmetrical locations instead of said toothed belt pulley 6. These two toothed belt pulleys are engaged with each of opposing portions 3a and 3b of toothed belt 3. In another device, a toothed belt pulley having the same diameter as toothed belt pulley 2 and engaging with said opposing portions 3a and 3b at both their right and left sides is arranged on said extending line 7a instead of the above-mentioned toothed belt pulley 6, with motor 5 arranged on said extending line 7a.

However, in the former constitution, since two toothed belt pulleys of the same diameter as well as two sets of mechanisms and so forth that support these pulleys while allowing them to rotate freely, are required. Thus the number of parts increases resulting in increased costs. In addition, with respect to the latter device, since a single toothed belt pulley engages at two locations with respect to toothed belt 3, namely at the above-mentioned opposing portions 3a and 3b, toothed belt 3 becomes excessively long thus resulting in cases wherein matching the engaging states at the two locations is difficult.

SUMMARY OF THE INVENTION

In consideration of the above-mentioned problems, the objective of the present invention is to provide a drive apparatus that secures lateral symmetry with respect to the entire apparatus, minimizes the number of parts, and achieves a smooth operating state.

The present invention is a drive apparatus equipped with rotors arranged separate from each other, a belt-shaped member wrapped around each of said rotors, a driving device that drives the rotors, and a parallelism maintaining device that maintains opposing portions of said belt-shaped member between the rotors roughly parallel with each other; wherein, a driven object to be moved is arranged to be surrounded by the belt-shaped member as well as coupled to the belt-shaped member, and the parallelism maintaining device is composed of a rotating member provided so as to make sliding contact with each of the opposing portions of the belt-shaped member at its outside surface.

DESCRIPTION OF THE PREFERRED EMBODIMENTS

The following provides a detailed explanation of a positioning table equipped with an embodiment of the drive apparatus of the present invention with reference to the attached drawings.

Figure 1:
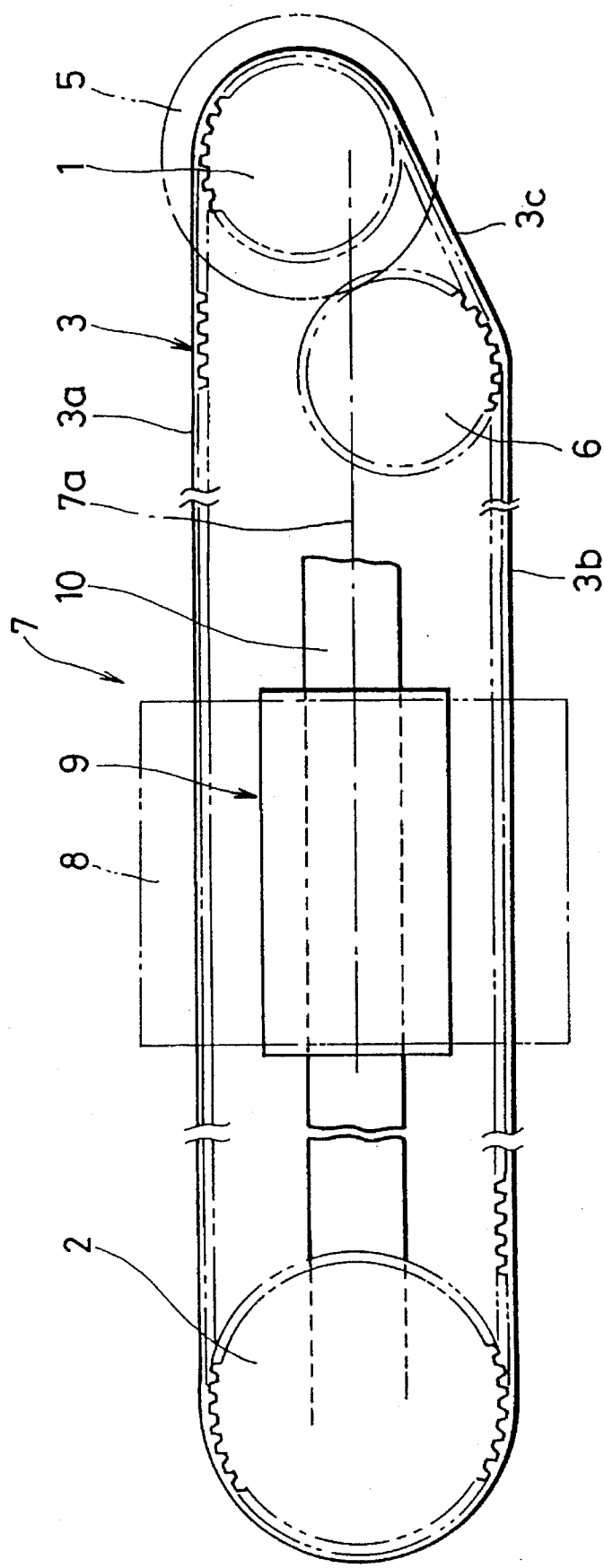
FIG. 1 is a top view of a drive apparatus of the prior art.
Figure 2:
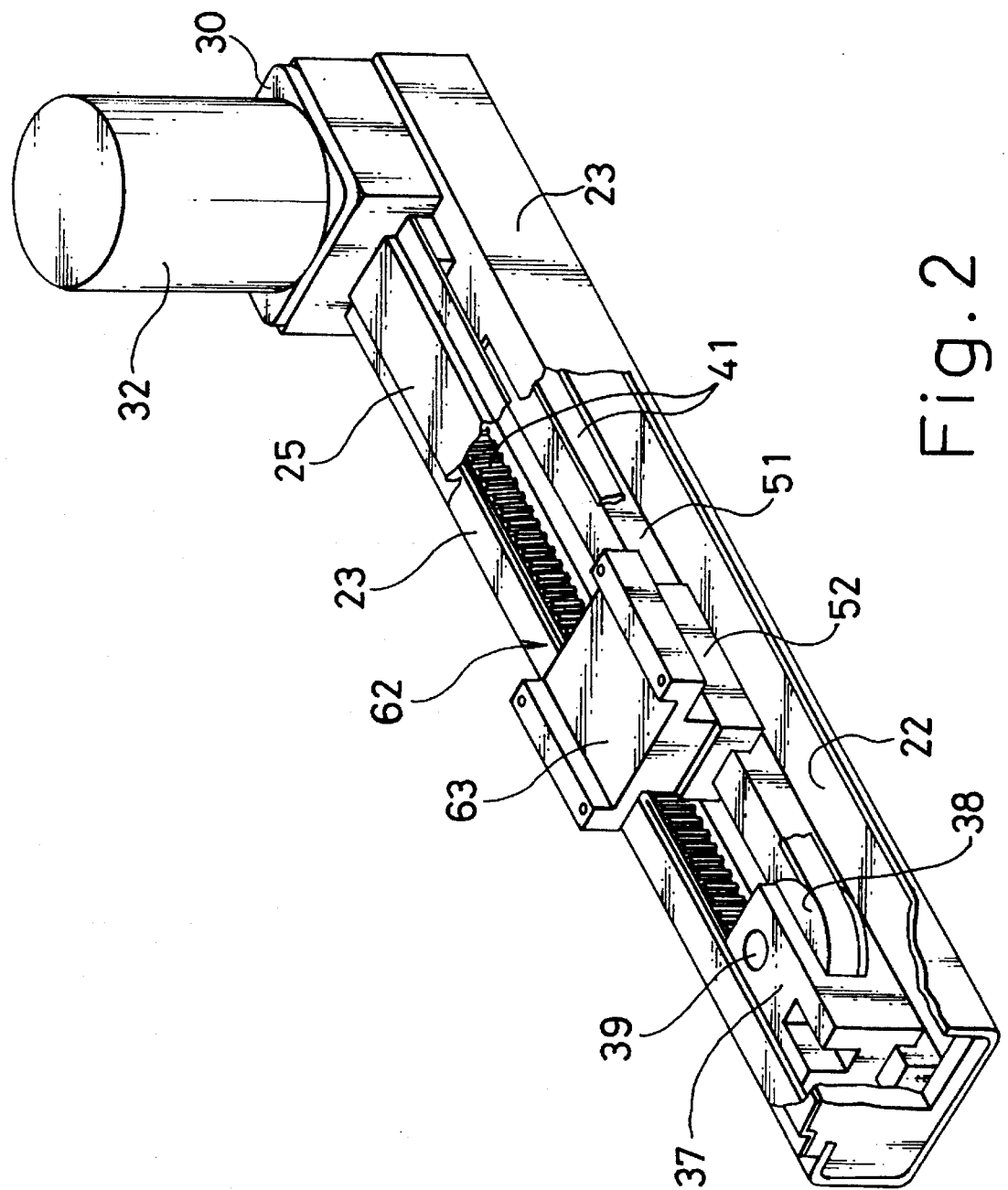
FIG. 2 is a perspective view, including a partial cross-section, of a positioning table equipped with an embodiment of the drive apparatus of the present invention.

As shown in FIG. 2, the positioning table as claimed in the present invention has a long, rectangular base 22, and side plates 23 provided on the base 22 that form a case for the apparatus together with the base 22. In addition, cover 25 is provided on side plates 23 to prevent the entrance of dust and so on.

Support member 30 is fixed on one end in the lengthwise direction of the above-mentioned base 22. A driving device in the form of motor 32 is mounted on the supporting member 30 with the output shaft facing down. The motor 32 is, for example, a stepping motor.

Figure 3:
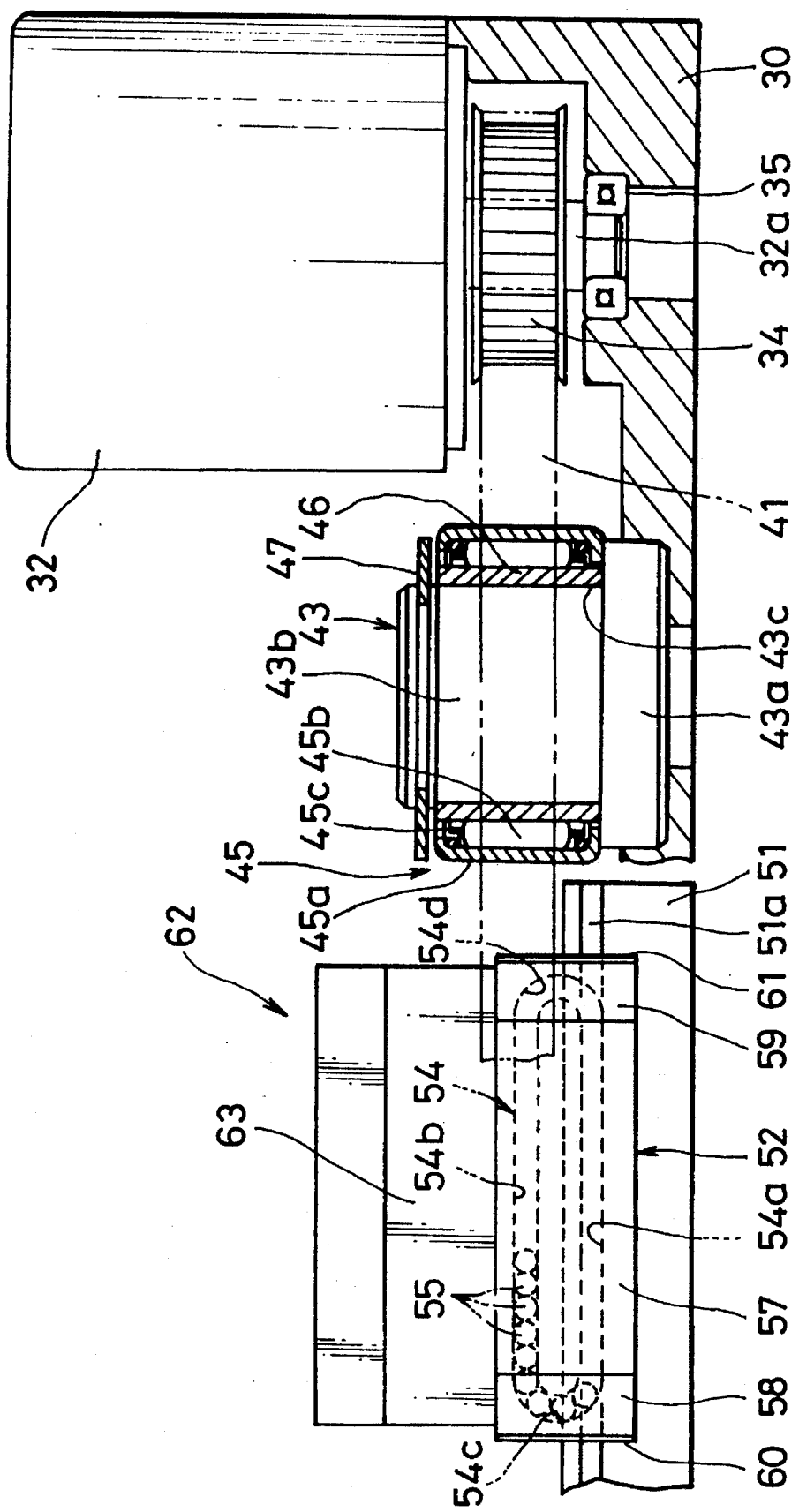
FIG. 3 is a side view, including a partial cross-section, of the essential portion of the positioning table shown in FIG. 2.

As shown in FIG. 3, a rotor in the form of toothed belt pulley 34 is fit onto output shaft 32a of motor 32. Furthermore, the end portion of output shaft 32a is axially supported by support member 30 by means of bearing 35.

On the other hand, as shown in FIG. 2, another support member 37 is fixed on the other end of the above-mentioned base 22, and a rotor in the form of toothed belt pulley 38 is attached to this support member 37 by means of support shaft 39 so as to be able to rotate freely. As is clear from FIG. 4, endless toothed belt 41 is wrapped around this toothed belt pulley 38 and the above-mentioned toothed belt pulley 34. Furthermore, toothed belt pulley 38 is of a larger diameter than toothed belt pulley 34 attached to motor 32.

Figure 4:
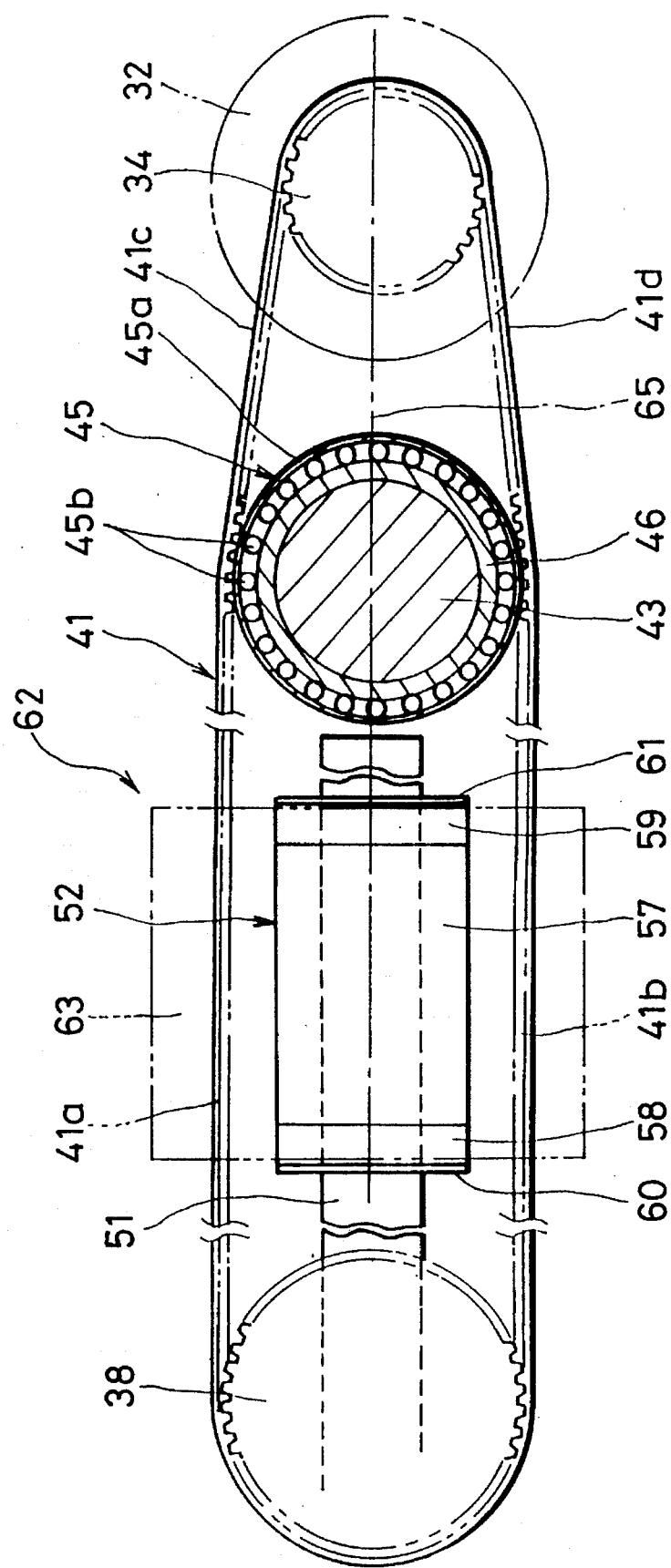
FIG. 4 is a top view, including a partial cross-section, of the essential portion of the positioning table shown in FIG. 2.

As shown in FIGS. 3 and 4, support shaft 43 is arranged in close proximity to toothed belt pulley 34 provided on motor 32, and is also attached to support member 30. A rotating member in the form of shell-type, needle-shaped roller bearing 45 is fit around the outside of this support shaft 43. Furthermore, shell-type, needle-shaped roller bearing 45 has a roughly cylindrical shell 45a formed to have a smooth outside surface, a plurality of needle-shaped rollers 45b arranged in a row along the inner circumference of shell 45a, and cage 45c that retains and guides each of said needle-shaped rollers 45b at an equal pitch (only shown in FIG. 3).

Inner wheel 46 is juxtapositioned between the above-mentioned shell-type, needle-shaped roller bearing 45 and support shaft 43 which supports it. Consequently, the rotation of shell-type, needle-shaped roller bearing 45 is highly accurate. In addition, as is clear from FIG. 3, the lower end 43a of support shaft 43 has a larger diameter than portion 43b that engages with the above-mentioned inner wheel 46. The above-mentioned shell-type, needle-shaped roller bearing 45 and inner wheel 46 are retained by upper surface 43c of this lower end 43a. In addition, locking wheel 47 is attached to the upper end of support shaft 43 which smoothly makes sliding contact with shell-type, needle-shaped roller bearing 45 and inner wheel 46 to prevent these components from coming of at support shaft 43.

The above-mentioned shell-type, needle-shaped roller bearing 45 acts as a parallelism maintaining device which maintains the opposing portions 41a and 41b of opposing toothed belt 41 mutually in parallel between the front and back toothed belt pulleys 34 and 38, and also applies the required tension to toothed belt 41. These opposing portions 41a and 41b make sliding contact at the outside surface of shell 45a equipped said shell-type, needle-shaped roller bearing 45.

As is particularly clear from FIG. 4, track rail 51 is provided so as to extend from near the above-mentioned toothed belt pulley 38 to near shell-type, needle-shaped roller bearing 45. Sliding unit 52 is straddled over this track rail 51, and moves freely along track rail 51.

More specifically, as shown in FIG. 3, one each of track grooves 51a are formed along the axial direction on both the left and right sides of track rail 51 (only one side is shown in the drawing). A plurality of rolling elements in the form of, for example, balls 55 are arranged and contained within rolling element circulating path 54 formed in both sides of sliding unit 52. Each of the balls 55 circulate within the rolling element circulating path 54 accompanying movement of the sliding unit 52 to bear the load between track rail 51 and sliding unit 52.

As is also shown in FIG. 4, sliding unit 52 has casing 57, a pair of end caps 58 and 59 coupled to both ends of the casing 57, and two seals 60 and 61 attached to the outside surfaces of each of the end caps 58 and 59. As shown in FIG. 3, the above-mentioned rolling element circulating path 54 is composed of load bearing track groove 54a and return path 54b each formed linearly and mutually in parallel in casing 57, and a pair of direction changing paths 54c and 54d formed in both ends caps 58 and 59 and connecting the load bearing track groove 54a and return path 54b at both ends thereof. Furthermore, the above-mentioned load bearing track groove 54a corresponds to track groove 51a of track rail 51.

Moving table 63 is mounted on the above-mentioned sliding unit 52 to compose driven object 62 together with the sliding unit 52. As is clear from FIGS. 2 and 4, at least one portion of this driven object 62 is arranged so as to be surrounded by endless toothed belt 41 as well as coupled to toothed belt 41 at one side thereof.

In the drive apparatus having the above-mentioned constitution, toothed belt 41 is driven as a result of toothed belt pulley 34 being driven by motor 32. Driven object 62, namely moving table 63 and sliding unit 52, which are coupled to toothed belt 41, then move along track rail 51.

As described above, in the drive apparatus as claimed in the present invention, a single shell-type, needle-shaped roller bearing 45 is provided that makes sliding contact at two locations of its outside surface with each of opposing portions 41a and 41b of toothed belt 41 wrapped around each of toothed belt pulleys 34 and 38, thus allowing the opposing portions 41a and 41b to be maintained parallel to each other. Accordingly, as is shown in FIG. 4, if each of toothed belt pulleys 34 and 38 as well as shell-type, needle-shaped roller bearing 45 are arranged in a row on a straight line, motor 32 provided directly coupled to toothed belt pulley 34 to rotate and drive the toothed belt pulley 34 can be arranged on an extending line 65 (shown in FIG. 4) in the center of the direction of width of driven object 62. As a result, as is shown in FIG. 4, the inclined portions 41c and 41d of toothed belt 41 exist in lateral symmetry, thus ensuring the lateral symmetry of the overall apparatus.

In addition, since only 1 set of shell-type, needle-shaped roller bearing 45 and members such as support shaft 43 which supports it need be provided, the number of parts can be minimized, thus achieving reduced costs. Moreover, since shell-type, needle-shaped roller bearing 45 only makes sliding contact with toothed belt 41 a smooth operating state is obtained.

In FIG. 4, the outer diameter of shell-type, needle-shaped roller bearing 45 is equal to the diameter of the troughs of toothed belt pulley 38. As a result, the mutual parallelism of both opposing portions 41a and 41b of toothed belt 41 is maintained with high accuracy.

Furthermore, although a toothed belt and toothed belt pulleys are indicated as the belt-shaped member and rotors in the present embodiment, the present invention can also be applied to a drive apparatus that uses other forms of belt-shaped members and rotors.

In addition, although a shell-type, needle-shaped roller bearing is employed for the rotating member that makes sliding contact with a belt-shaped member in the form of toothed belt 41, rotating members having other constitutions naturally may also be employed. However, since various sizes of shell-type, needle-shaped roller bearings are commercially available, in addition to the use of this type of roller bearing contributing to reduced costs, its use also contributes to increasing the degree of freedom of design. In addition, the use of a shell-type, needle-shaped roller bearing manufactured with high accuracy also increases the wear resistance of toothed belt 41 which makes contact with it.

As has been explained above, according to the present invention, a constitution is employed wherein rotating members are provided that make sliding contact at their outside surfaces with each of the opposing portions of a belt-shaped member wrapped around each rotor to obtain a state wherein said opposing portions are parallel to each other. Thus, a driving device in the form of a motor and so on that drives the above-mentioned rotors can be arranged on an extending line centered in the direction of width of a driven object. As a result, the lateral symmetry of the overall apparatus is secured, and together with offering excellent functionality when incorporated in various types of industrial machinery, the present invention also offers the advantage of obtaining an attractive appearance.

In addition, since the number of parts can be minimized, together with reduced costs being achieved, the present invention offers the advantage of obtaining a smooth operating state since the above-mentioned rotating member only makes sliding contact with a belt-shaped member.

What is claimed is:

1. A drive apparatus equipped with rotors arranged separate from each other, a belt-shaped member wrapped around each of said rotors, a driving device that drives said rotors, and a parallelism maintaining device that maintains opposing portions of said belt-shaped member between said rotors roughly parallel with each other; wherein, a driven object to be moved is arranged to be surrounded by said belt-shaped member as well as coupled to said belt-shaped member, and said parallelism maintaining device is composed of a rotating member provided so as to make sliding contact with each of said opposing portions of said belt-shaped member at its outside surface, wherein said rotors and belt-shaped member are respectively composed of toothed belt pulleys and a toothed belt, and the external diameter of said rotating member is at least equal to the diameter of the troughs of a furthermost one of said toothed belt pulleys.

2. The drive apparatus as set forth in claim 1 wherein each of said rotors and the center of rotation of said rotating member are arranged so as to lie in a row on a straight line.

3. The drive apparatus as set forth in claim 1 wherein said rotating member is composed of a shell-type, needle-shaped roller bearing.

4. The drive apparatus as set forth in claim 3 wherein an inner wheel is juxtapositioned between said shell-type, needle-shaped roller bearing and a support shaft which supports it.

* * * * *